United States Patent
Vargantwar (10) Patent No.: US 8,982,782 B1
(45) Date of Patent: Mar. 17, 2015

(54) METHOD AND SYSTEM OF SENDING POWER CONTROL COMMANDS

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 331 days.

(21) Appl. No.: 13/024,318

(22) Filed: Feb. 9, 2011

(51) Int. Cl.
*H04W 52/24* (2009.01)
*H04W 52/22* (2009.01)

(52) U.S. Cl.
CPC .......... *H04W 52/241* (2013.01); *H04W 52/228* (2013.01)
USPC .......................................... 370/328; 455/13.4

(58) Field of Classification Search
CPC .................................................. H04W 52/228
USPC .................. 455/522, 13.4; 370/328–338, 318
See application file for complete search history.

(56) References Cited

U.S. PATENT DOCUMENTS

| | | | |
|---|---|---|---|
| 6,208,873 B1 | 3/2001 | Black et al. | |
| 6,256,301 B1 | 7/2001 | Tiedemann, Jr. et al. | |
| 6,351,651 B1 * | 2/2002 | Hamabe et al. | 455/522 |
| 6,987,982 B2 | 1/2006 | Willenegger et al. | |
| 7,539,163 B2 * | 5/2009 | Lin | 370/331 |
| 2002/0115464 A1 * | 8/2002 | Hwang et al. | 455/522 |
| 2004/0092233 A1 | 5/2004 | Rudrapatna | |
| 2004/0176126 A1 * | 9/2004 | Sato et al. | 455/522 |
| 2005/0143113 A1 | 6/2005 | Lee et al. | |
| 2005/0153671 A1 | 7/2005 | Ichikawa | |
| 2007/0064640 A1 * | 3/2007 | Grilli et al. | 370/320 |
| 2007/0191044 A1 | 8/2007 | Kostic et al. | |

* cited by examiner

*Primary Examiner* — Khaled Kassim
*Assistant Examiner* — Zhaohui Yang (57) ABSTRACT

While a first entity and a second entity are engaging in a communication session on multiple wireless links, the first entity may adjust the power level at which to send power control commands (PCCs) directed to the second entity based on a respective channel quality at which each wireless link is carrying the communication session. For example, the first entity may identify which wireless link is carrying the communication session at a best channel quality and then cause an increase of a transmission power at which to send PCCs directed to the second entity on the identified wireless link. As another example, the first entity may determine that a respective channel quality of each wireless link satisfies a given condition and then cause an adjustment of a respective transmission power at which to send PCCs directed to the second entity on each wireless link.

19 Claims, 5 Drawing Sheets

METHOD AND SYSTEM OF SENDING POWER CONTROL COMMANDS

BACKGROUND

To provide cellular wireless communication service, a wireless service provider typically employs an access network that functions to connect one or more access terminals (e.g., cell phones, PDAs, laptops, netbooks, tablets, and/or other wirelessly-equipped devices) with one or more transport networks. In a typical access network, an area is divided geographically into a number of coverage areas, such as cells and sectors, each defined by a radio frequency (RF) radiation pattern from a respective base transceiver station (BTS). Within each coverage area, the BTS's RF radiation pattern may provide one or more wireless links, each on a carrier (or set of carriers), over which access terminals may communicate with the access network. In turn, the access network may provide connectivity with the public switched telephone network (PSTN), the Internet, and/or other transport networks.

The wireless links may carry communications between the access network and the access terminals according to any of a variety of wireless protocols. Depending on the protocol employed, each wireless link may also be divided into a plurality of channels for carrying communications between the access network and the access terminals. For example, each wireless link may include a plurality of forward-link channels, such as forward traffic channels, for carrying communications from the access network to the access terminals. As another example, each wireless link may include a plurality of reverse-link channels, such as reverse traffic channels, for carrying communications from the access terminals to the access network.

In many wireless protocols, while the access network and an access terminal are engaging in a communication session on a single wireless link, the access network and active access terminals may engage in default power-control processes to control transmission power on the wireless link for the communication session. In particular, the access network and the active access terminal may engage in a default reverse power-control process to control the reverse transmission power at which the access terminal sends bearer data for the communication session on an established reverse traffic channel of the wireless link. Similarly, the access terminal and the access network may engage in a default forward power-control process to control the forward transmission power at which the access network sends bearer data for the communication session on an established forward traffic channel of the wireless link.

In an example default power-control process, a power-controlling entity may send a series of power control commands (PCCs) directed to a power-controlled entity on the wireless link, each of which instructs the power-controlled entity to adjust its transmission power on the wireless link for the communication session. To facilitate sending each such PCC, the power-controlling entity may determine a channel quality at which the wireless link is carrying the communication session and compare the determined channel-quality to a threshold channel-quality. Based on that comparison, the power-controlling entity may decide to send either a "power up" PCC that instructs the power-controlled entity to increase its transmission power on the wireless link for the communication session (if the determined channel-quality is less than the threshold channel-quality) or a "power down" PCC that instructs the power-controlled entity to decrease its transmission power on the wireless link for the communication session (if the determined channel-quality is greater than the threshold channel-quality).

As the power-controlling entity sends the series of PCCs directed to the power-controlled entity, the power-controlled entity may receive PCCs from the series of PCCs sent by the power-controlling entity. As it receives these PCCs, the power-controlled entity may responsively adjust its transmission power for the communication session on the wireless link. For instance, in response to receiving a "power up" PCC from the power-controlling entity, the power-controlled entity may increase its transmission power for the communication session on the wireless link. And in response to receiving a "power down" PCC from the power-controlling entity the power-controlled entity may decrease its transmission power for the communication session on the wireless link.

Advantageously, such a default power-control process may enable the access network and active access terminals to balance between maintaining an acceptable strength of a traffic-channel communication and preventing the traffic-channel communication from becoming overly strong and unduly interfering with other communications.

OVERVIEW

In certain protocols, such as EIA/TIA/IS-2000 Rel. 0, Rel. A, or other versions thereof (hereafter "IS-2000"), an access network and an access terminal may also be capable of entering a "soft-handoff state" during which they engage in a communication session on multiple wireless links concurrently. While engaging in the communication session on the multiple wireless links, the access network and the access terminal may also engage in soft-handoff power-control processes to control transmission power on each of the multiple wireless links carrying the communication session.

In an example soft-handoff power-control process, a power-controlling entity may send a respective series of power control commands (PCCs) directed to a power-controlled entity on each of the multiple wireless links concurrently. For example, power-controlling entity may send a first series of PCCs directed to a power-controlled entity on a first wireless link, a second series of PCCs directed to a power-controlled entity on a second wireless link, etc. To facilitate sending each such PCC on each of the multiple wireless links, the power-controlling entity may use techniques similar to those described above with reference to the default power-control process.

As the power-controlling entity sends the respective series of PCCs directed to a power-controlled entity on each of the multiple wireless links concurrently, the power-controlled entity may receive PCCs from the respective series of PCCs sent by the power-controlling entity on each of the multiple wireless links. As it receives these PCCs, the power-controlled entity may responsively adjust its respective transmission power for the communication session on each of the multiple wireless links in a coordinated manner. For instance, in response to concurrently receiving a "power up" PCC from the power-controlling entity on all of the multiple wireless links (which indicates that the power-controlling entity is detecting a lower channel quality on all of the multiple wireless links), the power-controlled entity may increase its respective transmission power on all of the multiple wireless links. Further, in response to concurrently receiving a "power down" PCC from the power-controlling entity on any one or more of the multiple wireless links (which indicates that the power-controlling entity is detecting a higher channel quality on at least one of the multiple wireless links), the power-controlled entity may decrease its transmission power on all of the multiple wireless links.

While this soft-handoff power-control process generally works well to control the transmission power of a power-controlled entity while in a soft-handoff state, there may be times when the power-controlled adjust its transmission power on all of the multiple wireless links in a manner that is inconsistent with the PCCs sent by the power-controlling entity. For instance, at a given time, the power-controlling entity may send a "power down" PCC on one of the wireless links and a "power up" PCC on each of the other wireless links, which should cause the power-controlled entity to decrease its transmission power on all of the multiple wireless links. If the power-controlled entity fails to receive the "power down" PCC sent by the power-controlling entity (e.g., due to poor channel quality or other factors) and instead only receives the "power up" PCCs sent by the power-controlling entity, however, the power-controlled entity may erroneously increase its respective transmission power on all of the multiple wireless links. This erroneous increase in the power-controlled entity's transmission power on all of the multiple wireless links may result in unnecessary power consumption at the power-controlled entity and unnecessary interference on neighboring wireless links.

In certain protocols such as IS-2000, to reduce the likelihood of the power-controlled entity failing to receive PCCs during a soft-handoff power-control process, the power-controlling entity may be configured to increase the respective power level at which to send PCCs directed to the power-controlled entity on each of multiple wireless links by a predefined offset that correlates to the number of wireless links carrying the communication session (e.g., 2 dB for 2 wireless links, 3 dB for 3 wireless links, etc.). For instance, if the power-controlling entity and power-controlled entity are initially engaging in the communication session on a single wireless link, the power-controlling entity may send a series of PCCs directed to the power-controlled entity on the single wireless link at a baseline power level that is equal to the power level at which the power-controlling entity sends bearer data to the power-controlled entity on the single wireless link. Thereafter, if the power-controlling entity and power-controlled entity begin engaging in the communication session on multiple wireless links, the power-controlling entity may send respective series of PCCs directed to the power-controlled entity on each of the multiple wireless links at a respective increased power level that is a predefined offset higher than the respective power level at which the power-controlling entity sends the bearer data for the communication session on each of the multiple wireless links.

This mechanism for increasing the respective power level at which the power-controlling entity sends PCCs directed to the power-controlled entity on each of multiple wireless links by a predefined offset that correlates to the number of wireless links carrying the communication session may reduce the likelihood of the power-controlled entity failing to receive PCCs and thereby improve the overall effectiveness of the power-control process. Because this mechanism does not take channel quality into account when increasing the power level at which the power-controlling entity sends PCCs directed to the power-controlled entity on each of multiple wireless links, however, the predefined offset by which the power-controlling entity increases the power level on each of the multiple wireless links may not be appropriate.

For instance, if the channel quality on a given one of the multiple wireless links is poor, the predefined offset by which the power-controlling entity increases the power level at which to send PCCs directed to the power-controlled entity on the given one of the multiple wireless links may not be high enough. As a result, the power-controlled entity may still fail to receive certain increased-power PCCs from the power-controlling entity and thereby possibly err in the adjustment of its transmission power on all of the multiple wireless links. On the other hand, if the channel quality on a given one of the multiple wireless links is strong, the predefined offset by which the power-controlling entity increases the power level at which to send PCCs directed to the power-controlled entity on the given one of the multiple wireless links may be too high (or may not be necessary at all). As a result, the power-controlling entity may be unnecessarily consuming power and unnecessarily introducing interference on neighboring wireless links. Accordingly, a more intelligent mechanism for increasing the power level at which a power-controlling entity sends PCCs directed to a power-controlled entity during a soft-handoff power-control process is desirable.

Disclosed herein is such a mechanism. According to a example power-control process, while a power-controlling entity and a power-controlled entity are engaging in a communication session on multiple wireless links, the power-controlling entity may adjust the power level at which to send PCCs directed to the power-controlled entity based on the respective channel quality at which each of the multiple wireless link is carrying the communication session. The power-controlling entity may perform this adjustment using various techniques, which it may implement either separately or together.

According to a first embodiment of the example power-control process, the power-controlling entity may determine which one of the multiple wireless links is carrying the communication session at a best channel quality and then increase a transmission power at which to send PCCs directed to the power-controlled entity on that "best" wireless link (while either maintaining or decreasing a transmission power at which to send PCCs directed to the power-controlled entity on the other wireless links). As a result, the power-controlling entity sends increased-power PCCs on the wireless link carrying the given communication session at the best channel quality, which is also the wireless link that is most likely carrying "power down" PCCs (since a higher channel quality results in the transmission of "power down" PCCs). These increased-power PCCs may further reduce the likelihood of the power-controlled entity failing to receive PCCs—and in particular failing to receive "power down" PCCs—while engaging in the given communication session on multiple wireless links. Correspondingly, these increased-power PCCs may reduce the likelihood of the power-controlled entity erroneously increasing its respective traffic power on all of the multiple wireless links.

This first embodiment may take the form of a first example method that includes a first entity (e.g., an access network entity) (a) engaging in a given communication session with a second entity (e.g., an access terminal) on multiple wireless links, (b) identifying a first one of the multiple wireless links as carrying the given communication session at a best channel quality, and (c) in response to identifying the first one of the multiple wireless links, causing an increase of a transmission power at which to send PCCs directed to the second entity on the first one of the multiple wireless links from an initial transmission power level to an increased transmission power level.

The feature of identifying the first one of the multiple wireless links as carrying the given communication session at a best channel quality may take various forms. In one example, this feature may include (1) determining a respective channel quality (e.g., error rate or signal-to-noise ratio) at which each of the multiple wireless links is carrying the given communication session and (2) comparing the determined channel qualities and thereby determining that the first one of the multiple wireless links is carrying the given communication session at the best channel quality (e.g., the lowest error rate and/or the highest signal-to-noise ratio). Other examples are possible as well.

Further, the feature of causing an increase of the transmission power at which to send PCCs directed to the second entity on the first one of the multiple wireless links from an initial transmission power level to an increased transmission power level may take various forms. In one example, this feature may include beginning to send PCCs directed to the second entity at the increased transmission power level on the first one of the multiple wireless links. As another example, this feature may include instructing a third entity to increase the transmission power at which to send PCCs directed to the second entity on the first one of the multiple wireless links from the initial transmission power level to the increased transmission power level. Other examples are possible as well.

Still further, the initial transmission power level and increased transmission power level may take various forms. In one example, the initial transmission power level may be a transmission power level that is a first predefined offset (e.g., 1 dB) higher than a transmission power level at which the first entity is sending bearer data for the given communication on the first one of the multiple wireless links, and the increased transmission power level may be a transmission power level that is a second predefined offset (e.g., 3 dB) higher than the transmission power level at which the first entity is sending bearer data for the given communication on the first one of the multiple wireless links. According to this example, the initial transmission power level and the increased transmission power level may each vary depending on PCCs received from the second entity on the first one of the multiple wireless links as well as the number of wireless links carrying the given communication session. Other examples are possible as well.

The first example method may also include additional features. For example, the first example method may additionally include the first entity (d) subsequently to identifying the first one of the multiple wireless links as carrying the given communication session at a best channel quality, identifying a second one of the multiple wireless links as carrying the given communication session at the best channel quality, and (e) in response to identifying the second one of the multiple wireless links, (1) causing an increase of a transmission power at which to send PCCs directed to the second entity on the second one of the multiple wireless links and (2) causing a decrease of a transmission power at which to send PCCs directed to the second entity on the first one of the multiple wireless links. Other examples are possible as well.

According to a second embodiment of the example power-control process, the power-controlling entity may determine that a respective channel quality of each of the multiple wireless links satisfies a given condition and then adjust a respective transmission power at which to send PCCs directed to the power-controlled entity on each of the multiple wireless links in a coordinated manner based on that determination. For example, in response to determining that the respective channel quality of each of the multiple wireless links is greater than an upper limit, the power-controlling entity may decrease the respective transmission power at which to send PCCs directed to the power-controlled entity on each of the multiple wireless links in a coordinated manner (e.g., by decreasing or even eliminating the offset applied to the respective transmission power on each of the multiple wireless links). As another example, in response to determining that the respective channel quality of each of the multiple wireless links is less than a lower limit, the power-controlling entity may decrease the respective transmission power at which to send PCCs directed to the power-controlled entity on each of the multiple wireless links in a coordinated manner (e.g., by increasing the offset applied to the respective transmission power on each of the multiple wireless links). As a result, the power-controlling entity may send PCCs on each of the multiple wireless links at a power level that properly accounts for the channel qualities on the multiple wireless links.

This second embodiment may take the form of a second example method that includes a first entity (e.g., an access network entity) (a) engaging in a given communication session with a second entity (e.g., an access terminal) on multiple wireless links, (b) determining that a respective channel quality of each of the multiple wireless links satisfies a given condition, and (c) in response to the determining, causing an adjustment of a respective transmission power at which to send PCCs directed to the second entity on each of the multiple wireless links in a coordinated manner.

The feature of determining that the respective channel quality of each of the multiple wireless links satisfies the given condition may take various forms. In one example, this feature may include comparing the respective channel quality of each of the multiple wireless links to an upper limit and thereby determining that the respective channel quality of each of the multiple wireless links is greater than the upper limit, in which case causing an adjustment of the respective transmission power at which to send PCCs directed to the second entity on each of the multiple wireless links in a coordinated manner may include causing a decrease of the respective transmission power at which to send PCCs directed to the second entity on each of the multiple wireless links. In another example, this feature may include comparing the respective channel quality of each of the multiple wireless links to a lower limit and thereby determining that the respective channel quality of each of the multiple wireless links is less than the lower limit, in which case causing an adjustment of the respective transmission power at which to send PCCs directed to the second entity on each of the multiple wireless links in a coordinated manner may include causing an increase of the respective transmission power at which to send PCCs directed to the second entity on each of the multiple wireless links. Other examples are possible as well.

Further, the feature of causing an adjustment of the transmission power at which to send PCCs directed to the second entity on each of the multiple wireless may take various forms. In one example, this feature may include beginning to send PCCs directed to the second entity at a respective adjusted transmission power level on each of the multiple wireless links. As another example, this feature may include instructing a third entity to adjust the respective transmission power at which to send PCCs directed to the second entity on each of the multiple wireless links. Other examples are possible as well.

Also disclosed herein is an access network entity (e.g., a base station controller and/or a mobile switching center) that includes (a) a communication interface configured to facilitate communication with an access terminal via a path that includes one or more wireless links provided by one or more base transceiver stations, (b) a processor, (c) data storage, and (d) program instructions stored in data storage and executable by the processor to carry out the features described herein.

These as well as other aspects and advantages will become apparent to those of ordinary skill in the art by reading the following detailed description, with reference where appropriate to the accompanying drawings.

DETAILED DESCRIPTION

I. Communication System

Figure 1:
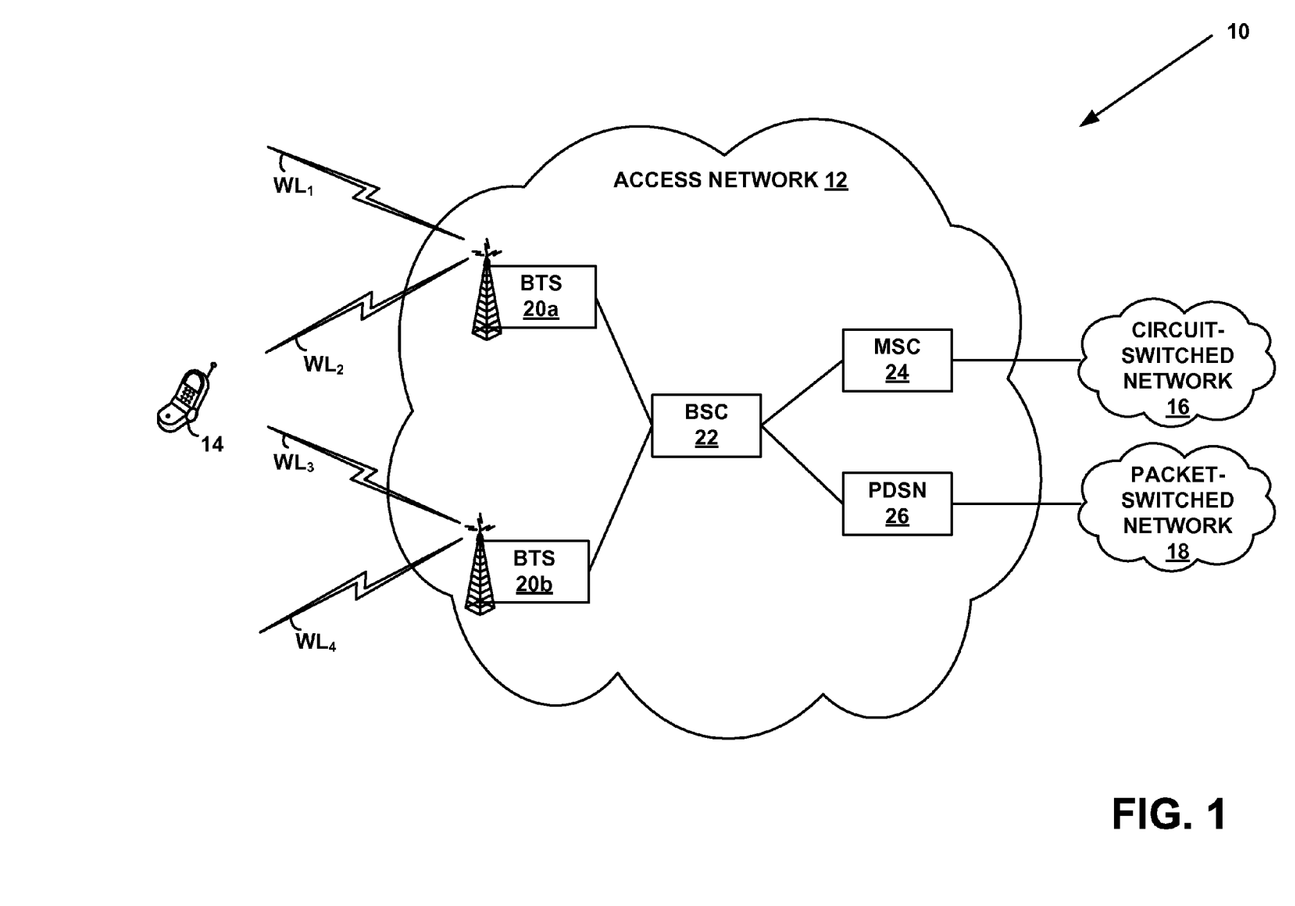
FIG. 1 is a simplified block diagram of a communication system in which a power-control process can be implemented.

FIG. 1 is a simplified block diagram of a communication system 10 in which an example power-control can be implemented. As shown, the system 10 may include an access network 12 that functions to provide connectivity between one or more access terminals, such as active access terminal 14, and one or more transport networks, such as a circuit-switched network 16 (e.g., the Public Switched Telephone Network (PSTN)) and a packet-switched network 18 (e.g., the Internet).

It should be understood that the arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions written in any suitable programming language (e.g., C, C++, Java, etc.) and stored in memory.

As shown in FIG. 1, access network 12 may include one or more base transceiver stations (BTSs), such as BTS 20a and BTS 20b. (Although FIG. 1 depicts access network 12 as including two BTSs, it should be understood that access network 12 may include more than two BTSs.) Each BTS may be any entity that facilitates wireless communication between access network 12 and one or more access terminals, such as access terminal 14. In particular, each BTS may radiate to define one or more wireless coverage areas, such as a cell and/or cell sectors. Within each of its coverage areas, each BTS may provide one or more wireless links over which one or more access terminals may communicate with the BTS. For example, as shown, BTS 20a may be configured to provide a first wireless link $WL_1$ and a second wireless link $WL_2$, and BTS 20b may be configured to provide a third wireless link $WL_3$ and a fourth wireless link $WL_4$. Various other configurations are possible as well. Each BTS may also control aspects of wireless communication with access terminal 14, such as aspects of connection establishment, handoff, and/or power control for instance. Each BTS may perform other functions as well.

Each wireless link may carry communications between access network 12 and access terminal 14 according to any of a variety of protocols, including IS-2000, EIA/TIA/IS-856 Rel. 0, Rev. A, or other versions thereof ("IS-856"), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, or other protocols now known or later developed. Further, each wireless link may be divided into a forward link for carrying communications from the access network to the one or more access terminals and a reverse link for carrying communications from the one or more access terminals to the access network. In turn, each forward link and each reverse link may be divided into a plurality of channels using any mechanism now known or later developed, including code division multiplexing, time division multiplexing, and/or frequency division multiplexing for instance.

For purposes of illustration only, the embodiments herein will be described by way of example with the wireless links carrying communications according to an IS-2000 protocol (also known as 1xRTT). According to IS-2000, each wireless link may be identified by its carrier frequency and a unique pseudonoise offset ("PN offset") that distinguishes the wireless link from other wireless links provided by access network 12. Each IS-2000 wireless link may include a forward link that is code division multiplexed via Walsh codes into various forward channels for carrying communications from access network 12 to one or more access terminals, such as a forward pilot channel, a forward sync channel, forward control channels (e.g., one or more forward paging channels, one or more forward common control channels, and/or a forward broadcast control channel), and one or more forward traffic channels (e.g., each of which may include a forward power control sub-channel). Similarly, each IS-2000 wireless link may include a reverse link that is code division multiplexed via Walsh codes into various reverse channels for carrying communications from one or more access terminals to access network 12, such as one or more reverse access channels, one or more reverse pilot channels (e.g., each of which may include a reverse power control sub-channel), and one or more reverse traffic channels.

According to IS-2000, access network 12 and access terminal 14 may be capable of entering a "soft-handoff state" during which they engage in a given communication session on multiple wireless links (defining the access terminal's "active set"). For instance, while in a soft-handoff state, access network 12 and access terminal 14 may have forward and reverse traffic channels established on two or more wireless links $WL_1$-$WL_4$, such as wireless links $WL_1$, $WL_2$, and $WL_4$. In that case, access network 12 may send forward-bearer data for the given communication session on a respective forward link of each of wireless links $WL_1$, $WL_2$, and $WL_4$, and access network 14 may send reverse-bearer data for the given communication session on a respective reverse link of each of wireless links $WL_1$, $WL_2$, and $WL_4$. This ability to engage in a given communication session concurrently on multiple wireless links may enable access network 12 and access terminal 14 to remain connected over at least one wireless link at all times, which may result in a more seamless communication session as access terminal 14 moves through the access network's defined coverage areas. Further, this ability to engage in a given communication session concurrently on multiple wireless links may enable access network 12 and access terminal 14 to send and receive redundant data on multiple wireless links, which may result in a more reliable communication session. Other benefits may exist as well.

Referring again to FIG. 1, access network 12 may also include at least one base station controller (BSC), such as BSC 22, to which each BTS couples. (Although FIG. 1 depicts access network 12 as including one BSC, it should be understood that access network 12 may include more than one BSC, in which case each BSC may couple to a subset of the BTSs in access network 12. Further, although BSC 22 is depicted as separate entity from BTSs 20*a-b*, it should be understood that BSC 22 may be integrated together in whole or in part with one or both of BTSs 20*a-b*. Further yet, BSC 22 and one or both of BTSs 20*a-b* may together be referred to as a "base station.") BSC 22 may control aspects of BTSs 20*a-b* as well as aspects of wireless communication with access terminal 14, such as aspects of connection establishment, handoff, and/or power control for instance. BSC 22 may perform other functions as well.

Further, access network 12 may include at least one mobile switching center (MSC), such as MSC 24, to which BSC 22 couples. (Although FIG. 1 depicts access network 12 as including one MSC, it should be understood that access network 12 may include more than one MSC, in which case each MSC may couple to a subset of the BSCs in access network 12.) As shown, MSC 24 may provide connectivity with circuit-switched network 16. Further, MSC 24 may control aspects of BTSs 20*a-b* and/or BSC 22 as well as aspects of wireless communication with access terminal 14, such as aspects of connection establishment, handoff, and/or power control for instance. MSC 24 may perform other functions as well.

Further yet, access network 12 may include at least one packet data serving node (PDSN), such as PDSN 26, to which BSC 22 couples. (Although FIG. 1 depicts access network 12 as including one PDSN, it should be understood that access network 12 may include more than one PDSN, in which case each PDSN may couple to a subset of the BSCs in access network 12.) As shown, PDSN 26 may provide connectivity with packet-switched network 16. PSDN 26 may perform other functions as well.

Although not shown, access network 12 may also include and/or have access to various other entities. For example, access network 12 may include or have access to a home location register (HLR) and/or a visitor location register (VLR) that maintains profile data for subscribers and/or access terminals in access network 12, such as account information, preferences, and/or a last-known location for instance. Other examples are possible as well.

Access terminal 14 may be any device configured to receive wireless service from access network 12. By way of example only, access terminal 14 may take the form of a cellular telephone, a computer (e.g., a desktop, laptop, tablet, netbook, etc.), a personal digital assistant (PDA), or a personal navigation device (PND). Other examples are possible as well.

II. Current Power-Control Process a. Single-Link Communications

In the example communication system 10 depicted in FIG. 1, access network 12 and access terminal 14 may begin engaging in a given communication session on a single wireless link, such as wireless link $WL_1$. For instance, access network 12 and access terminal 14 may first establish a forward traffic channel and a reverse traffic channel on wireless link $WL_1$. In turn, access network 12 may begin to send forward-bearer data for the given communication session at an initial forward transmission power value (e.g., 2.2 watts) on the established forward channel of wireless link $WL_1$. Similarly, access terminal 14 may begin to send reverse-bearer data for the given communication session at an initial reverse transmission power value (e.g., 0 dBm) on the established reverse channel of wireless link $WL_1$.

As noted above, while access network 12 and access terminal 14 are engaging in the given communication session on wireless link $WL_1$, access network 12 and access terminal 14 may also engage in a power-control process to control the transmission power for the given communication session on wireless link $WL_1$. In particular, access network 12 and access terminal 14 may engage in a reverse power-control process to control the reverse transmission power at which access terminal 14 sends bearer data for the given communication session on the established reverse traffic channel of wireless link $WL_1$ (i.e., the reverse traffic power for the given communication session). Similarly, access terminal 14 and access network 12 may engage in a forward power-control process to control the forward transmission power at which access network 12 sends bearer data for the given communication session on the established forward traffic channel of wireless link $WL_1$ (i.e., the forward traffic power for the given communication session). These power-control processes may take various forms.

i. Example Reverse Power-Control

According to an example reverse power-control process, access network 12 may regularly determine a quality at which the established reverse traffic channel of wireless link $WL_1$ is carrying the given communication session (i.e., a reverse-channel quality). Access network 12 may then regularly compare the determined reverse-channel quality to a threshold reverse-channel quality and thereby decide whether to send a "power up" PCC that instructs access terminal 14 to increase its reverse traffic power for the given communication session on wireless link $WL_1$ or a "power down" PCC that instructs access terminal 14 to decrease its reverse traffic power for the given communication session on wireless link $WL_1$. For instance, based on each comparison, access network 12 may decide to send (a) a "power up" PCC directed to access terminal 14 if the determined reverse-channel quality is less than the threshold reverse-channel quality (which indicates that access network 12 is detecting a lower reverse-channel quality) or (b) a "power down" PCC directed to access terminal 14 if the measured reverse-channel quality is greater than the threshold reverse-channel quality (which indicates that access network 12 is detecting a higher reverse-channel quality). Accordingly, access network 12 may send a series of PCCs directed to access terminal 14 on wireless link $WL_1$.

As access network 12 sends the series of PCCs directed to access terminal 14 on wireless link $WL_1$, access terminal 14 may receive the series of PCCs from access network 12 on wireless link $WL_1$. (As noted above, however, that access terminal 14 may fail to receive some PCCs sent by access network 12 due to poor forward-channel quality or other factors.) In response to each PCC received from access network 12 on wireless link $WL_1$, access terminal 14 may then responsively adjust its reverse traffic power on wireless link $WL_1$ in accordance with the PCC. For instance, access terminal 14 may increase its reverse traffic power on wireless link $WL_1$ in response to receiving a "power up" PCC from access network 12 and decrease its reverse traffic power on wireless link $WL_1$ in response to receiving a "power down" PCC from access network 12. Accordingly, during this reverse power-control process, access terminal 14 may continually adjust its reverse traffic power for the given communication session on wireless link $WL_1$.

ii. Example Forward Power-Control

According to an example forward power-control process, access terminal 14 may regularly determine a quality at which the established forward traffic channel of wireless link $WL_1$ is carrying the given communication session (i.e., a forward-channel quality). Access terminal 14 may then regularly compare the determined forward-channel quality to a threshold forward-channel quality and thereby decide whether to send a "power up" PCC that instructs access network 12 to increase its forward traffic power on wireless link $WL_1$ or a "power down" PCC that instructs access network 12 to decrease its forward traffic power on wireless link $WL_1$. For instance, based on each comparison, access terminal 14 may decide to send (a) a "power up" PCC directed to access network 12 if the determined forward-channel quality is less than the threshold forward-channel quality (which indicates that access terminal 14 is detecting a lower forward-channel quality) or (b) a "power down" PCC directed to access network 12 if the measured forward-channel quality is greater than the threshold forward-channel quality (which indicates that access terminal 14 is detecting a higher forward-channel quality). Accordingly, access terminal 14 may send a series of PCCs directed to access network 12 on wireless link $WL_1$.

As access terminal 14 sends the series of PCCs directed to access network 12 on wireless link $WL_1$, access network 12 may receive the series of PCCs from access terminal 14 on wireless link $WL_1$. (Likewise, however, access network 12 may fail to receive some PCCs sent by access terminal 14 due to poor reverse-channel quality or other factors.) In response to each PCC received from access terminal 14 on wireless link $WL_1$, access network 12 may then responsively adjust its forward traffic power for the given communication session on wireless link $WL_1$ in accordance with the PCC. For instance, access network 12 may increase its forward traffic power for the given communication session on wireless link $WL_1$ in response to receiving a "power up" PCC from access terminal 14 and decrease its forward traffic power on wireless link $WL_1$ for the given communication session in response to receiving a "power down" PCC from access terminal 14. Accordingly, during this forward power-control process, access network 12 may continually adjust its forward traffic power for the given communication session on wireless link $WL_1$.

iii. PCC Transmission Power

While engaging in the power-control processes described above, access network 12 and access terminal 14 may send PCC data on wireless link $WL_1$ at a baseline power level that is equal to the power level at which access network 12 and access terminal 14 send bearer data for the given communication session on wireless link $WL_1$. For instance, the forward power at which access network 12 sends PCCs directed to access terminal 14 on the established forward channel of wireless link $WL_1$ (i.e., the baseline forward PCC power level) may be equal to the access network's forward traffic power for the given communication session on wireless link $WL_1$, which varies depending on the PCCs received from access terminal 14 on wireless link $WL_1$. Similarly, the reverse power at which access terminal 14 sends PCCs directed to access network 12 on wireless link $WL_1$ (i.e., the baseline reverse PCC power level) may be equal to the access terminal's reverse traffic power for the given communication session on wireless link $WL_1$, which varies depending on the PCCs received from access network 12 on wireless link $WL_1$.

B. Multiple-Link Communications

At some point during the given communication session (if not at the start of the session), access network 12 and access terminal 14 may also enter a soft-handoff state and begin engaging in the given communication session on multiple wireless links, such as wireless links $WL_1$, $WL_2$, and $WL_4$. For instance, access network 12 and access terminal 14 may establish additional forward and reverse traffic channels on each of wireless links $WL_2$ and $WL_4$. In turn, access network 12 may continue to send the forward-bearer data for the given communication session at the forward traffic power on wireless link $WL_1$ (which varies depending on the PCCs received from access terminal 14 on wireless link $WL_1$) and begin to send the forward-bearer data for the given communication session at an initial forward traffic power value (e.g., 2.2 watts) on each of wireless links $WL_2$ and $WL_4$. Similarly, access terminal 14 may continue to send reverse-bearer data for the given communication session at the reverse traffic power on wireless link $WL_1$ (which varies depending on the PCCs received from access network 12 on wireless link $WL_1$) and begin to send the reverse-bearer data for the given communication session at an initial reverse traffic power value (e.g., 0 dBm) on each of wireless links $WL_2$ and $WL_4$.

While access network 12 and access terminal 14 are engaging in the given communication session on wireless links $WL_1$, $WL_2$, and $WL_4$, access network 12 and access terminal 14 may also engage in a power-control process to control transmission power for the given communication session on each of wireless links $WL_1$, $WL_2$, and $WL_4$. In particular, access network 12 and access terminal 14 may engage in a reverse power-control process to control the access terminal's respective reverse traffic power for the given communication session on each of wireless links $WL_1$, $WL_2$, and $WL_4$. Similarly, access terminal 14 and access network 12 may engage in a forward power-control process to control the access network's respective forward traffic power for the given communication session on each of wireless links $WL_1$, $WL_2$, and $WL_4$. These power-control processes may take various forms.

i. Example Reverse Power-Control

According to an example reverse power-control process, while engaging in the given communication session on wireless links $WL_1$, $WL_2$, and $WL_4$, access network 12 may regularly determine a respective reverse-channel quality at which each of wireless links $WL_1$, $WL_2$, and $WL_4$ is carrying the given communication session. For each of wireless links $WL_1$, $WL_2$, and $WL_4$, access network 12 may then regularly compare the determined reverse-channel quality to a threshold reverse-channel quality and thereby decide whether to send a "power up" PCC that instructs access terminal 14 to increase its reverse traffic power for the given communication session on the wireless link or a "power down" PCC that instructs access terminal 14 to decrease its reverse traffic power for the given communication session on the wireless link. Accordingly, access network 12 may concurrently send a respective series of PCCs directed to access terminal 14 on each of wireless links $WL_1$, $WL_2$, and $WL_4$.

As access network 12 concurrently sends the respective series of PCCs directed to access terminal 14 on each of wireless links $WL_1$, $WL_2$, and $WL_4$, access terminal 14 may receive the respective series of PCCs concurrently on each of wireless links $WL_1$, $WL_2$, and $WL_4$. As noted above, however, access terminal 14 may fail to receive some PCCs sent by access network 12 due to poor forward-link quality or other factors.

As access terminal 14 concurrently receives the respective series of PCCs sent by access network 12 on each of wireless links $WL_1$, $WL_2$, and $WL_4$, access terminal 14 may adjust its respective reverse traffic power for the given communication session on all of wireless links $WL_1$, $WL_2$, and $WL_4$ in a coordinated manner. For instance, access terminal 14 may increase its respective reverse traffic power on all of wireless links $WL_1$, $WL_2$, and $WL_4$ in response to receiving a "power up" PCC from access network 12 concurrently on all of wireless links $WL_1$, $WL_2$, and $WL_4$ (which indicates that access network 12 is detecting a lower reverse-channel quality on all of wireless links $WL_1$, $WL_2$, and $WL_4$). And access terminal 14 may decrease its respective reverse traffic power on all of wireless links $WL_1$, $WL_2$, and $WL_4$ in response to receiving a "power down" PCC from access network 12 on any of wireless links $WL_1$, $WL_2$, and $WL_4$ (which indicates that access network 12 is detecting a higher reverse-channel quality on at least one of wireless links $WL_1$, $WL_2$, and $WL_4$). Other examples are possible as well.

Accordingly, during this reverse power-control process, access terminal 14 may continually adjust its respective reverse traffic power for the given communication session on each of wireless links $WL_1$, $WL_2$, and $WL_4$.

ii. Example Forward Power-Control

According to an example forward power-control process, while engaging in the given communication session on wireless links $WL_1$, $WL_2$, and $WL_4$, access terminal 14 may regularly determine a respective forward-channel quality at which each of wireless links $WL_1$, $WL_2$, and $WL_4$ is carrying the given communication session. For each of wireless links $WL_1$, $WL_2$, and $WL_4$, access terminal 14 may regularly compare the determined forward-channel quality to a threshold forward-channel quality and thereby decide whether to send a "power up" PCC that instructs access network 12 to increase its forward traffic power for the given communication session on the wireless link or a "power down" PCC that instructs access network 12 to decrease its forward traffic power for the given communication session on the wireless link. Accordingly, access terminal 14 may concurrently send a respective series of PCCs directed to access network 12 on each of wireless links $WL_1$, $WL_2$, and $WL_4$.

As access terminal 14 concurrently sends the respective series of PCCs directed to access network 12 on each of wireless links $WL_1$, $WL_2$, and $WL_4$, access network 12 may receive the respective series of PCCs concurrently on each of wireless links $WL_1$, $WL_2$, and $WL_4$. As noted above, however, access network 12 may fail to receive some PCCs sent by access terminal 14 due to poor reverse-link quality or other factors.

As access network 12 concurrently receives the respective series of PCCs sent by access terminal 14 on each of wireless links $WL_1$, $WL_2$, and $WL_4$, access network 12 may also adjust its respective forward traffic power for the given communication session on each of wireless links $WL_1$, $WL_2$, and $WL_4$ in a coordinated manner. For instance, access network 12 may increase its respective forward traffic power on all of wireless links $WL_1$, $WL_2$, and $WL_4$ in response to receiving a "power up" PCC from access terminal 14 concurrently on all of wireless links $WL_1$, $WL_2$, and $WL_4$ (which indicates that access terminal 14 is detecting a lower forward-channel quality on all of wireless links $WL_1$, $WL_2$, and $WL_4$). And access network 12 may decrease its respective forward traffic power on all of wireless links $WL_1$, $WL_2$, and $WL_4$ in response to receiving a "power down" PCC from access terminal 14 on any of wireless links $WL_1$, $WL_2$, and $WL_4$ (which indicates that access terminal 14 is detecting a higher forward-channel quality on at least one of wireless links $WL_1$, $WL_2$, and $WL_4$). Other examples are possible as well.

Accordingly, during this forward power-control process, access network 12 may continually adjust its respective forward traffic power for the given communication session on each of wireless links $WL_1$, $WL_2$, and $WL_4$.

iii. PCC Transmission Power

In certain protocols such as IS-2000, after beginning to engage in the given communication session on multiple wireless links, access network 12 and access terminal 14 may each be configured to increase the respective power level at which to send PCCs on each of the multiple wireless links by a predefined offset that correlates to the number of wireless links carrying the communication session (e.g., 2 dB for 2 wireless links, 3 dB for 3 wireless links, etc.). For instance, after beginning to engage in the given communication session on wireless links $WL_1$, $WL_2$, and $WL_4$, the access network's respective forward PCC power for each of wireless links $WL_1$, $WL_2$, and $WL_4$ may be a predefined offset higher (e.g., 3 dB) than the access network's respective forward traffic power for the given communication session on each of wireless links $WL_1$, $WL_2$, and $WL_4$. Similarly, the access terminal's respective reverse PCC power for each of wireless links $WL_1$, $WL_2$, and $WL_4$ may be a predefined offset (e.g., 3 dB) higher than the access terminal's respective reverse traffic power for the given communication session on each of wireless links $WL_1$, $WL_2$, and $WL_4$.

This mechanism for increasing the respective power level at which access network 12 and access terminal 14 send PCCs on each of multiple wireless links by a predefined offset that correlates to the number of wireless links carrying the given communication session may reduce the likelihood of access network 12 and access terminal 14 failing to receive PCCs and thereby improve the overall effectiveness of the power-control processes. Because this mechanism does not take channel quality into account when increasing the respective power at which access network 12 and access terminal 14 send PCCs on each of the multiple wireless links, however, the predefined offset by which access network 12 and access terminal 14 increase the respective power level on each of the multiple wireless links may not be appropriate.

For instance, if the channel quality on a given one of wireless links $WL_1$, $WL_2$, and $WL_4$ is poor, the predefined offset by which access network 12 increases the power level at which to send PCCs directed to access terminal 14 (and vice versa) on the given one of wireless links $WL_1$, $WL_2$, and $WL_4$ may not be high enough. As a result, access terminal 14 may still fail to receive certain increased-power PCCs from access network 12 and thereby possibly err in the adjustment of its transmission power on all of wireless links $WL_1$, $WL_2$, and $WL_4$. For example, as described above, access terminal 14 may be configured to decrease its respective reverse traffic power on all of wireless links $WL_1$, $WL_2$, and $WL_4$ in response to receiving a "power down" PCC from access network 12 on any of wireless links $WL_1$, $WL_2$, and $WL_4$. If access terminal 14 fails to receive the only "power down" PCC sent by access network 12 on wireless links $WL_1$, $WL_2$, and $WL_4$ at a given time, however, access terminal 14 may erroneously increase (instead of decrease) its respective reverse traffic power on all of wireless links $WL_1$, $WL_2$, and $WL_4$. This erroneous increase in the access terminal's respective reverse traffic power on all of wireless links $WL_1$, $WL_2$, and $WL_4$ may consume additional power at access terminal 14 and introduce additional interference on the wireless links provided by access network 12.

On the other hand, if the channel quality on a given one of wireless links $WL_1$, $WL_2$, and $WL_4$ is strong, the predefined offset by which access network 12 increases the power level at which to send PCCs directed to access terminal 14 (and vice versa) on the given one of wireless links $WL_1$, $WL_2$, and $WL_4$ may be too high (or may not be necessary at all). As a result, access network 12 may be unnecessarily consuming power and unnecessarily introducing interference on other wireless links provided by access network 12.

Accordingly, a more intelligent mechanism for increasing the power level at which a power-controlling entity sends PCCs directed to a power-controlled entity during a soft-handoff power-control process is desirable.

III. Disclosed Power-Control Process

As noted above, disclosed herein is such a mechanism. According to an example power-control process, while a power-controlling entity and a power-controlled entity are engaging in a communication session on multiple wireless links, the power-controlling entity may adjust the power level at which to send PCCs directed to the power-controlled entity based on the respective channel quality at which each of the multiple wireless link is carrying the communication session.

Figure 2:
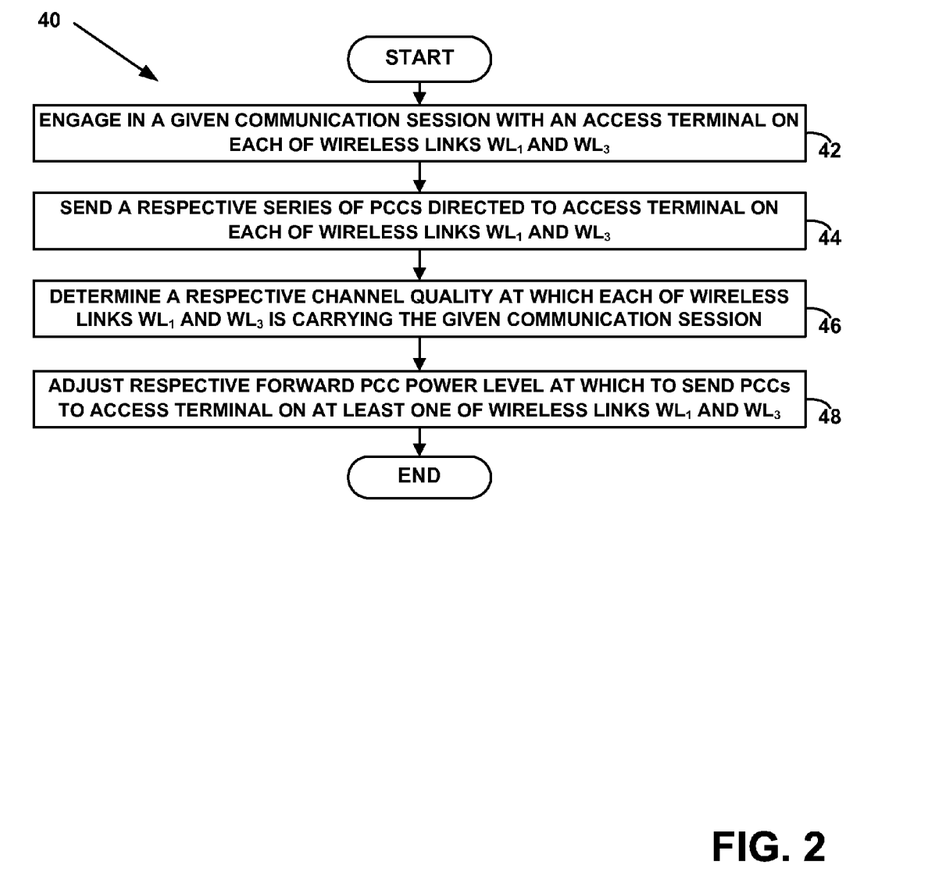
FIG. 2 is a simplified flow chart depicting an example power-control process.

FIG. 2 is a flow chart depicting an example power-control process 40. For purposes of illustration, example process 40 will be described with reference to access network 12 sending PCCs directed to access terminal 14, to control the reverse traffic power of access terminal 14. It should be understood, however, that example process 40 may be applicable to any configuration in which a power-controlling entity is sending PCCs directed to a power-controlled entity.

As shown in FIG. 2, example process 40 begins at step 42 with access network 12 and access terminal 14 entering into a soft-handoff state during which they begin engaging in a given communication session on multiple of wireless links $WL_1$-$WL_4$, such as wireless links $WL_1$ and $WL_3$. For instance, access network 12 and access terminal 14 may initiate the given communication session on each of wireless links $WL_1$ and $WL_3$ using a process known as "channel assignment into soft handoff" (CASHO). Alternatively, access network 12 and access terminal 14 may initially be engaging in the given communication session on a single wireless link, such as wireless link $WL_1$, and access network 12 and access terminal 14 may then extend the given communication session to wireless link $WL_3$. In either case, after entering the soft-handoff state, access network 12 and access terminal 14 may have a respective forward and reverse traffic channel established on each of wireless links $WL_1$ and $WL_3$.

While engaging in the given communication session on wireless links $WL_1$ and $WL_3$, access network 12 may send forward-bearer data for the given communication session on each of wireless links $WL_1$ and $WL_3$ at a respective forward traffic power level in which the respective forward traffic power for each of wireless links $WL_1$ and $WL_3$ varies depending on the respective PCCs received from access terminal 14 on each of wireless links $WL_1$ and $WL_3$. And access terminal 14 may send reverse-bearer data for the given communication session on each of wireless links $WL_1$ and $WL_3$ at a respective reverse traffic power level in which the respective reverse traffic power for each of wireless links $WL_1$ and $WL_3$ varies depending on the respective PCCs received from access network 12 on each of wireless links $WL_1$ and $WL_3$.

At step 44, after entering the soft-handoff state, access network 12 may begin to concurrently send a respective series of PCCs directed to access terminal 14 at a respective initial forward PCC power level on each of wireless links $WL_1$ and $WL_3$. (For purposes of FIG. 2, the term "initial forward PCC power level" means the power level at which access network 12 sends PCCs directed to access terminal 14 while in the soft-handoff state before deciding to adjust the forward PCC power according to the techniques described herein). For example, after entering the soft-handoff state, BTS 20a may be sending a first series of PCCs directed to access terminal 14 at a first initial forward PCC power level on a forward traffic channel of wireless link $WL_1$, and BTS 20b may be sending a second series of PCCs directed to access terminal 14 at a second initial forward PCC power level on a forward traffic channel of wireless link $WL_3$. Other examples are possible as well.

The respective initial forward PCC power level at which access network 12 sends the respective series of PCCs directed to access terminal 14 on each of wireless links $WL_1$ and $WL_3$ may take various forms. In one example, the respective initial PCC power level for each of wireless links $WL_1$ and $WL_3$ may be set at a first predefined offset (e.g., 2 dB) higher than the respective forward traffic power for each of wireless links $WL_1$ and $WL_3$, with the first predefined offset correlating to the number of wireless links carrying the communication session. As such, according to this example, the access network's respective initial forward PCC power for each of wireless links $WL_1$ and $WL_3$ varies depending on the access network's respective forward traffic power for each of wireless links $WL_1$ and $WL_3$ (and thus depending on the respective PCCs received from access terminal 14 on each of wireless links $WL_1$ and $WL_3$). Other examples are possible as well.

As access network 12 concurrently sends the respective series of PCCs directed to access terminal 14 at the respective initial forward PCC power level on each of wireless links $WL_1$ and $WL_3$, access terminal 14 may concurrently receive the respective series of initial-power PCCs sent by access network 12 on each of wireless links $WL_1$ and $WL_3$. For example, access terminal 14 may be concurrently receiving the first series of first-initial-power PCCs sent by BTS 20a on wireless link $WL_1$ and the second series of second-initial-power PCCs sent by BTS 20b on wireless link $WL_3$. Other examples are possible as well. As noted above, however, access terminal 14 may fail to receive some PCCs sent by access network 12 due to poor forward-link quality or other factors.

As access terminal 14 concurrently receives the respective series of PCCs sent by access network 12 on each of wireless links $WL_1$ and $WL_3$, access terminal 14 may adjust its reverse traffic power on both of wireless links $WL_1$ and $WL_3$ in a coordinated manner. As noted above, for example, access terminal 14 may (a) increase its reverse traffic power on both of wireless links $WL_1$ and $WL_3$ in response to receiving a "power up" PCC from access network 12 on both of wireless links $WL_1$ and $WL_3$ and (b) decrease its reverse traffic power on both of wireless links $WL_1$ and $WL_3$ response to receiving a "power down" PCC from access network 12 on at least one of wireless links $WL_1$ and $WL_3$. Other examples are possible as well.

At step 46, while concurrently sending the respective series of PCCs directed to access terminal 14 at the respective initial forward PCC power level on each of wireless links $WL_1$ and $WL_3$, access network 12 may determine a channel quality at which each of wireless links $WL_1$ and $WL_3$ is carrying the given communication session. Access network 12 may perform this determination in various manners.

In one example, access network 12 may determine a reverse channel quality metric for each of wireless links $WL_1$ and $WL_3$, such as an error rate (e.g., a frame error rate (FER) or a bit error rate (BER)) of the reverse-bearer data for the given communication session received from access terminal 14 on each of wireless links $WL_1$ and $WL_3$ or a signal-to-noise ratio (e.g., bit energy to noise ($E_b/N_o$) or chip energy to total RF energy ($E_c/I_0$)) of the reverse-link channel carrying the given communication session on each of wireless links $WL_1$ and $WL_3$. Access network 12 may perform the determination of the reverse-channel quality metric either separate from or in conjunction with the above-described determination of reverse-channel quality metric used to decide whether to send a "power up" or "power down" PCC.

In another example, access network 12 may determine a forward channel quality metric for each of wireless links $WL_1$ and $WL_3$, such as an error rate (e.g., a frame error rate (FER) or a bit error rate (BER)) of the forward-bearer data for the given communication session received from access network 12 on each of wireless links $WL_1$ and $WL_3$. Other examples are possible as well.

At step 48, based on the determined channel quality at which each of wireless links $WL_1$ and $WL_3$ is carrying the given communication session, access network 12 may adjust the respective forward PCC power level at which to send PCCs directed to access terminal 14 on at least one of wireless links $WL_1$ and $WL_3$. Access network 12 may employ various techniques to perform this adjustment, which it may implement separately or together.

Figure 3:
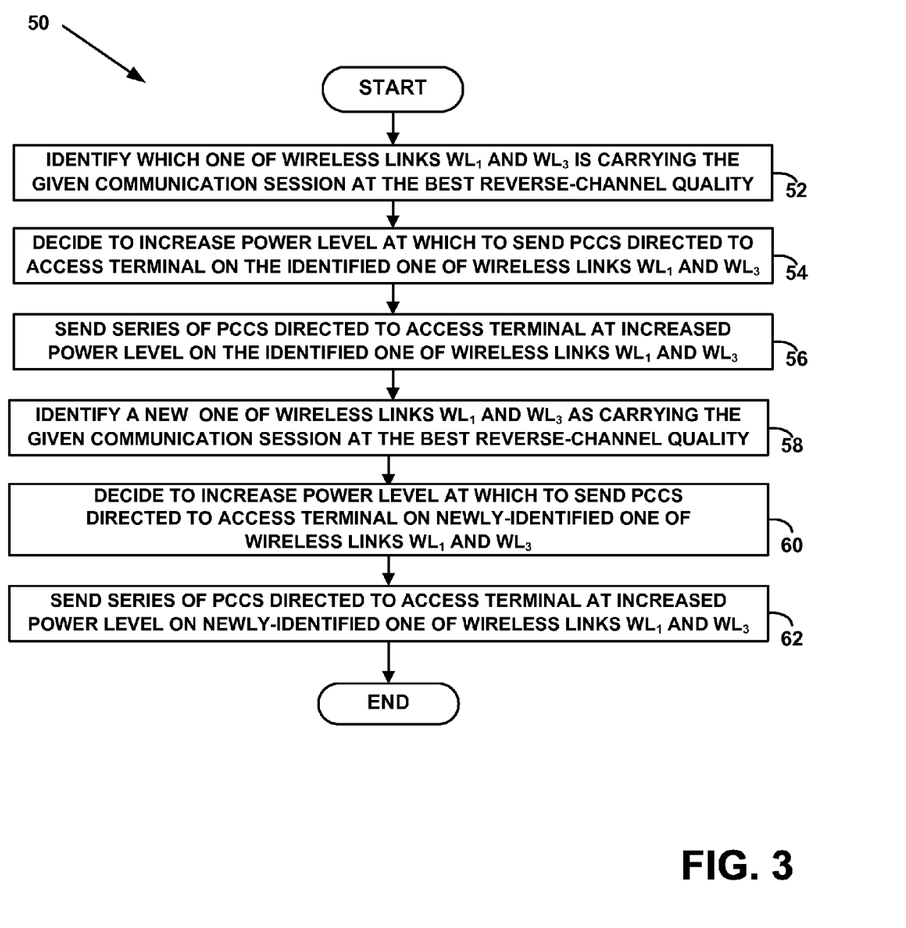
FIG. 3 is a simplified flow chart depicting an embodiment of a first technique for adjusting a respective power level at which to send PCCs directed to an access terminal on at least one of multiple wireless links.

According to a first technique for adjusting the respective forward PCC power level at which to send PCCs directed to access terminal 14 on at least one of wireless links $WL_1$ and $WL_3$, access network 12 may determine which one of wireless links $WL_1$ and $WL_3$ is carrying the communication session at a best channel quality and then increase the forward PCC power at which to send PCCs directed to access terminal 14 on that "best" wireless link (while either maintaining or decreasing the respective forward PCC power at which to send PCCs directed to access terminal 14 on each of the other wireless links). FIG. 3 is a flow chart depicting an example embodiment 50 of this first technique.

As shown in FIG. 3, embodiment 50 may begin at step 52 with access network 12 identifying which one of wireless links $WL_1$ and $WL_3$ is carrying the given communication session at the best channel quality. For example, BSC 22 and/or MSC 24 may determine that the reverse-bearer data for the given communication session received from access terminal 14 on wireless link $WL_1$ has the lowest error rate and thereby identify wireless link $WL_1$ as carrying the given communication session at the best channel quality. As another example, BSC 22 may determine that the reverse-link channel carrying the given communication session on wireless link $WL_1$ has the highest signal-to-noise ratio and thereby identify wireless link $WL_1$ as carrying the given communication session at the best channel quality. Other examples are possible as well.

At step 54, in response to identifying which one of wireless links $WL_1$ and $WL_3$ is carrying the given communication session at the best channel quality, access network 12 may decide to increase the forward PCC power level at which to send PCCs directed to access terminal 14 on the identified one of wireless links $WL_1$ and $WL_3$ from an initial forward PCC power level to an increased forward PCC power level. For example, in response to identifying wireless link $WL_1$ as carrying the given communication session at the best channel quality, BSC 22 and/or MCS 24 may instruct BTS 20*a* to increase the forward PCC power level at which to send PCCs directed to access terminal 14 on wireless link $WL_1$ from the first initial forward PCC power level to a first increased forward PCC power level. In turn, BTS 20*a* may increase the forward PCC power level at which to send PCCs directed to access terminal 14 on wireless link $WL_1$ to the first increased forward PCC power level (e.g., by increasing the offset applied to the forward PCC power at which to send PCCs directed to access terminal 14 on wireless link $WL_1$ during a soft-handoff state). BTS 20*a* may also update a stored indicator defining the forward PCC power level at which to send PCCs directed to access terminal 14 on wireless link $WL_1$, to reflect the first increased forward PCC power level. Other examples are possible as well.

The increased forward PCC power level at which to send PCCs directed to access terminal 14 on the identified one of wireless links $WL_1$ and $WL_3$ may take various forms. In one example, the increased forward PCC power level for the identified one of wireless links $WL_1$ and $WL_3$ may be set at a second predefined offset (e.g., 3 dB) higher than the forward traffic power level for the identified one of wireless links $WL_1$ and $WL_3$. As such, according to this example, the forward PCC power for the identified one of wireless links $WL_1$ and $WL_3$ still varies depending on the access network's respective forward traffic power for the identified one of wireless links $WL_1$ and $WL_3$ (and thus depending on the PCCs received from access terminal 14 on the identified one of wireless links $WL_1$ and $WL_3$). Other examples are possible as well.

In a preferred embodiment, when deciding to increase the forward PCC power level at which to send PCCs directed to access terminal 14 on the identified one of wireless links $WL_1$ and $WL_3$, access network 12 may decide to maintain the forward PCC power level at which to send PCCs directed to access terminal 14 on the unidentified one of wireless links $WL_1$ and $WL_3$. In an alternate embodiment, however, access network 12 may decide to decrease the forward PCC power level at which to send PCCs directed to access terminal 14 on the unidentified one of wireless links $WL_1$ and $WL_3$ from an initial forward PCC power level to a decreased forward PCC power level. For example, in response to identifying wireless link $WL_1$ as carrying the given communication session at the best channel quality, BSC 22 and/or MCS 24 may instruct BTS 20*b* to decrease the forward PCC power level at which to send PCCs directed to access terminal 14 on wireless link $WL_3$ from the second initial forward PCC power level to a second decreased forward PCC power level. In turn, BTS 20*b* may decrease the forward PCC power level at which to send PCCs directed to access terminal 14 on wireless link $WL_3$ to the second decreased forward PCC power level (e.g., by decreasing the offset applied to the forward PCC power at which to send PCCs directed to access terminal 14 on wireless link $WL_3$ during a soft-handoff state). BTS 20*b* may also update a stored indicator defining the forward PCC power level at which to send PCCs directed to access terminal 14 on wireless link $WL_3$, to reflect the second decreased forward PCC power level. Other examples are possible as well.

The decreased forward PCC power level at which to send PCCs directed to access terminal 14 on the unidentified one of wireless links $WL_1$ and $WL_3$ may take various forms. In one example, the decreased forward PCC power level for the unidentified one of wireless links $WL_1$ and $WL_3$ may be set at a third predefined offset (e.g. 1 dB) lower than the forward traffic power for the unidentified one of wireless links $WL_1$ and $WL_3$. As such, according to this example, the forward PCC power for the unidentified one of wireless links $WL_1$ and $WL_3$ still varies depending on the access network's respective forward traffic power for the unidentified one of wireless links $WL_1$ and $WL_3$ (and thus depending on the PCCs received from access terminal 14 on the unidentified one of wireless links $WL_1$ and $WL_3$). Other examples are possible as well.

At step 56, after deciding to increase the forward PCC power level at which to send PCCs directed to access terminal 14 on the identified one of wireless links $WL_1$ and $WL_3$, access network 12 may transition to sending the series of PCCs directed to access terminal 14 at the increased forward PCC power level on the identified one of wireless links $WL_1$ and $WL_3$. For example, in response to receiving an instruction to increase the forward PCC power level at which to send PCCs directed to access terminal 14 on wireless link $WL_1$ and then updating the stored indicator defining the forward PCC power level for wireless link $WL_1$, BTS 20a may transition to sending the first series of PCCs directed to access terminal 14 at the first increased forward PCC power level on the forward traffic channel of wireless link $WL_1$. Other examples are possible as well. While sending the series of PCCs directed to access terminal 14 at the increased forward PCC power level on the identified one of wireless links $WL_1$ and $WL_3$, access network 12 may also continue sending the series of PCCs directed to access terminal 14 at the initial forward PCC power level (or alternatively a decreased forward PCC power level) on the unidentified one of wireless links $WL_1$ and $WL_3$.

As access network 12 sends the series of PCCs directed to access terminal 14 at the increased forward PCC power level on the identified one of wireless links $WL_1$ and $WL_3$ and sends the series of PCCs directed to access terminal 14 at the initial forward PCC power level on the unidentified one of wireless links $WL_1$ and $WL_3$, access terminal 14 may receive the series of increased-power PCCs sent by access network 12 on the identified one of wireless links $WL_1$ and $WL_3$ and receive the series of initial-power PCCs sent by access network 12 on the unidentified one of wireless links $WL_1$ and $WL_3$. For example, access terminal 14 may receive the first series of first-increased-power PCCs sent by BTS 20a on wireless link $WL_1$ and receive the second series of second-initial-power PCCs sent by BTS 20b on wireless link $WL_3$. Other examples are possible as well.

While access terminal 14 may still fail to receive some PCCs in the respective series of PCCs sent by access network 12 due to poor forward-link quality or other factors, the increased-power PCCs sent by access network 12 on the identified one of wireless links $WL_1$ and $WL_3$ may reduce the likelihood of access terminal 14 failing to receive PCCs on that link. And since the identified one of wireless links $WL_1$ and $WL_3$ is carrying the given communication session at the best channel quality and is thus most likely to be carrying "power down" PCCs, the increased-power PCCs sent by access network 12 on the identified one of wireless links $WL_1$ and $WL_3$ may reduce the likelihood of access terminal 14 failing to receive "power down" PCCs.

As access terminal 14 concurrently receives the series of increased-power PCCs on the identified one of wireless links $WL_1$ and $WL_3$ and the series of initial-power PCCs on the unidentified one of wireless links $WL_1$ and $WL_3$, access terminal 14 may continue to adjust its reverse traffic power on each of wireless links $WL_1$ and $WL_3$ in a coordinated manner. For instance, as noted above, access terminal 14 may continue to (a) increase its reverse traffic power on each of wireless links $WL_1$ and $WL_3$ in response to receiving a "power up" PCC from access network 12 on both of wireless links $WL_1$ and $WL_3$ and (b) decrease its reverse traffic power on each of wireless links $WL_1$ and $WL_3$ response to receiving a "power down" PCC from access network 12 on at least one of wireless links $WL_1$ and $WL_3$.

At steps 58, while concurrently sending the respective series of PCCs directed to access terminal 14 at the increased forward PCC power level on the identified one of wireless links $WL_1$ and $WL_3$ and at the initial forward PCC power level the unidentified one of wireless links $WL_1$ and $WL_3$, access network 12 may then identify a new one of wireless links $WL_1$ and $WL_3$ (and/or any other of wireless links $WL_1$-$WL_4$) as carrying the given communication session at the best channel quality.

At step 60, in response to identifying the new one of wireless links $WL_1$ and $WL_3$ as carrying the given communication session at the best channel quality, access network 12 may decide to increase the forward PCC power at which to send PCCs directed to access terminal 14 on the newly-identified one of wireless links $WL_1$ and $WL_3$ from an initial forward PCC power level to an increased forward PCC power level. Correspondingly, access network 12 may decide to decrease the forward PCC power at which to send PCCs directed to access terminal 14 on the previously-identified one of wireless links $WL_1$ and $WL_3$ from the increased forward PCC power level back to the initial forward PCC power level.

At step 62, in response to deciding to increase the forward PCC power at which to send PCCs directed to access terminal 14 on the newly-identified one of wireless links $WL_1$ and $WL_3$, access network 12 may transition to sending the series of PCCs directed to access terminal 14 at the increased forward PCC power level on the newly-identified one of wireless links $WL_1$ and $WL_3$. Further, in response to deciding to decrease the forward PCC power at which to send PCCs directed to access terminal 14 on the previously-identified one of wireless links $WL_1$ and $WL_3$, access network 12 may transition to sending the respective series of PCCs directed to access terminal 14 at the initial forward PCC power level on the previously-identified one of wireless links $WL_1$ and $WL_3$.

Figure 4:
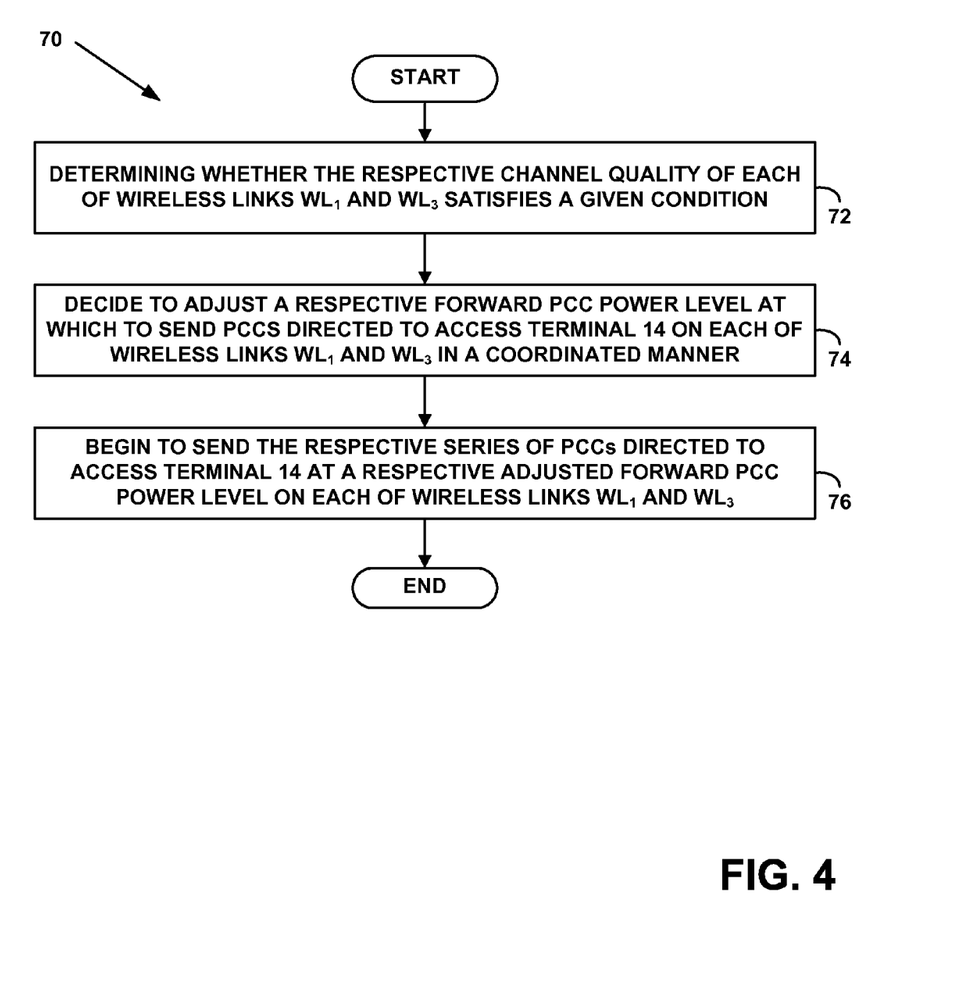
FIG. 4 is a simplified flow chart depicting an embodiment of a second technique for adjusting a respective power level at which to send PCCs directed to an access terminal on at least one of multiple wireless links.

Referring back to FIG. 2, according to a second technique for adjusting the respective forward PCC power level at which to send PCCs directed to access terminal 14 on at least one of wireless links $WL_1$ and $WL_3$, access network 12 may determine that a respective channel quality of each of wireless links $WL_1$ and $WL_3$ satisfies a given condition and then adjust a respective transmission power at which to send PCCs directed to access terminal 14 on each of wireless links $WL_1$ and $WL_3$ in a coordinated manner based on that determination. FIG. 4 is a flow chart depicting an example embodiment 70 of this second technique.

As shown in FIG. 4, embodiment 70 may begin at step 72 with access network 12 determining whether a respective channel quality of each of wireless links $WL_1$ and $WL_3$ (e.g., forward and/or reverse FER) satisfies a given condition. For example, access network 12 may compare the respective channel quality of each of wireless links $WL_1$ and $WL_3$ to an upper limit and thereby determine whether each such channel quality is greater than the upper limit. As another example, access network 12 may compare the respective channel quality of each of wireless links $WL_1$ and $WL_3$ to a lower limit and thereby determine whether each such channel quality is less than the lower limit. Other examples are possible as well.

At step 74, in response to determining that the respective channel quality of each of wireless links $WL_1$ and $WL_3$ satisfies the given condition, access network 12 may decide to adjust a respective forward PCC power level at which to send PCCs directed to access terminal 14 on each of wireless links $WL_1$ and $WL_3$ in a coordinated manner. For example, in response to determining that the channel quality of each of wireless links $WL_1$ and $WL_3$ is greater than an upper limit, access network 12 may decide to decrease the respective forward PCC power level at which to send PCCs directed to access terminal 14 on each of wireless links $WL_1$ and $WL_3$ by the same amount. As another example, in response to determining that the channel quality of each of wireless links $WL_1$ and $WL_3$ is less than a lower limit, access network 12 may decide to increase the respective forward PCC power level at which to send PCCs directed to access terminal 14 on each of wireless links $WL_1$ and $WL_3$ by the same amount.

In either case, BSC 22 and/or MCS 24 may instruct BTSs 20*a* and 20*b* to adjust the respective forward PCC power level at which to send PCCs directed to access terminal 14 on each of wireless links $WL_1$ and $WL_3$. In turn, BTSs 20*a* and BTS 20*b* may adjust the respective forward PCC power level at which to send PCCs directed to access terminal 14 on each of wireless links $WL_1$ and $WL_3$ (e.g., by increasing the offset applied to the respective forward PCC power at which to send PCCs directed to access terminal 14 on each of wireless links $WL_1$ and $WL_3$ during a soft-handoff state). BTSs 20*a* and 20*b* may also update a stored indicator defining the respective forward PCC power level at which to send PCCs directed to access terminal 14 on each of wireless link $WL_1$ and $WL_3$, to reflect the adjusted forward PCC power level. Other examples are possible as well.

At step 76, after deciding to adjust the respective forward PCC power level at which to send PCCs directed to access terminal 14 on each of wireless links $WL_1$ and $WL_3$ in a coordinated manner, access network 12 may transition to sending the series of PCCs directed to access terminal 14 at a respective adjusted forward PCC power level on each of wireless links $WL_1$ and $WL_3$. For example, BTS 20*a* may transition to sending the first series of PCCs directed to access terminal 14 at a first adjusted forward PCC power level on the forward traffic channel of wireless link $WL_1$ and BTS 20*b* may transition to sending the second series of PCCs directed to access terminal 14 at a second adjusted forward PCC power level on the forward traffic channel of wireless link $WL_3$. Other examples are possible as well. Access network 12 may thus be sending PCCs on each of wireless links $WL_1$ and $WL_3$ at a power level that properly accounts for the channel qualities on wireless links $WL_1$ and $WL_3$.

IV. Example Access Network Entity

Figure 5:
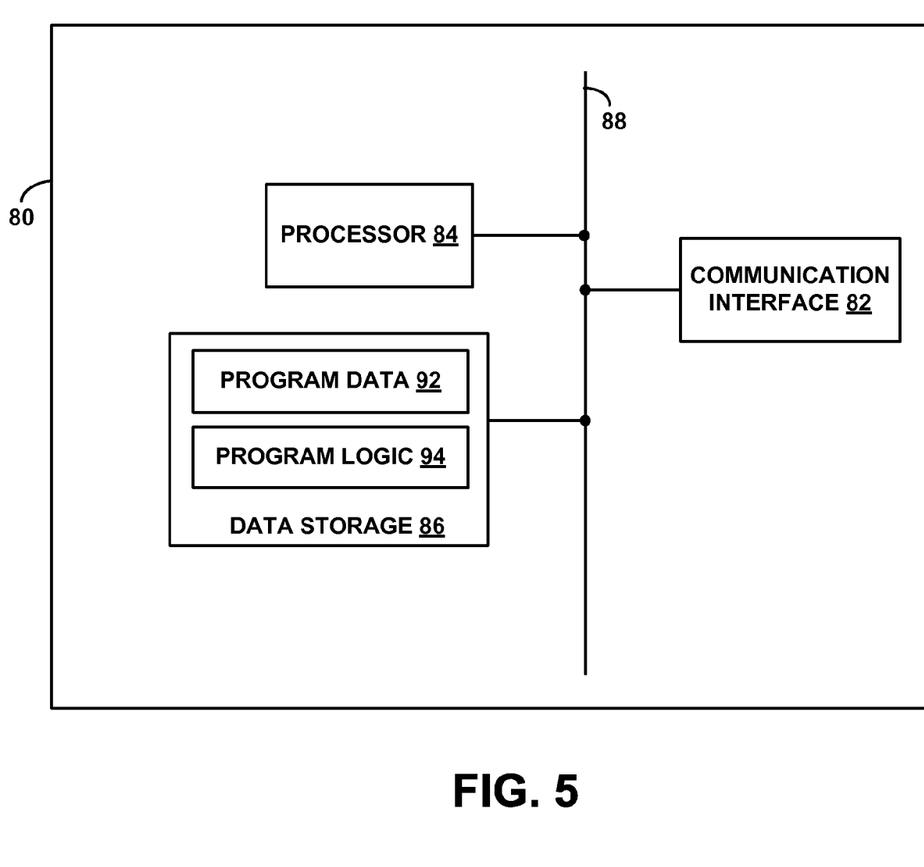
FIG. 5 is a simplified block diagram showing functional components of an example access network entity capable of carrying out features of the example embodiment of the disclosed power-control process.

FIG. 5 is a simplified block diagram showing functional components of an example access network entity 80 that is configured to carry out features of example process 40. Access network entity 80 may take the form of a BTS, a BSC, an MSC, and/or some other access network entity that is capable of carrying out features of example process 40. As shown in FIG. 5, example access network entity 80 may include a communication interface 82, a processor 84, and data storage 86, all linked together via a system bus, network, or other connection mechanism 88. Access network entity 80 may include other components as well.

Referring to FIG. 5, communication interface 82 may be configured to communicatively couple access network entity 80 to various other entities. For example, if access network entity 80 takes the form of a BSC, communication interface 82 may be configured to communicatively couple the BSC to one or more BTSs, one or more MSCs, and/or one or more PDSNs, among other entities. As another example, if access network entity 80 takes the form of a MSC, communication interface 82 may be configured to communicatively couple the MSC to one or more BSCs, one or more other MSCs, and/or one or more circuit-switched networks, among other entities. Other examples are possible as well. To facilitate these couplings, communication interface 82 may take various forms. For example, communication interface 82 may take the form of an Ethernet interface, a serial bus interface (e.g., Firewire, USB 2.0, etc.), a chipset and antenna adapted to facilitate wireless communication according a desired protocol, and/or any other interface that provides for wired and/or wireless communication with an entity. Communication interface 82 may also include some combination of different interfaces types. Other configurations are possible as well.

Processor 84 may comprise one or more processor components, such as general-purpose processors (e.g., a microprocessor), application-specific processors (e.g., an application-specific integrated circuit (ASIC) or digital signal processor (DSP)), programmable logic devices (e.g., a field programmable gate array (FPGA)), or other processor components now known or later developed. Data storage 86, in turn, may comprise one or more non-transitory computer-readable storage mediums, such as volatile data storage mediums (e.g., random access memory (RAM), registers, and/or cache) and/or non-volatile data storage mediums (e.g., read only memory (ROM), a hard disk drive, a solid state drive, flash memory, and/or an optical storage device). Some data storage mediums may be integrated in whole or in part with processor 84. Further, some data storage mediums may be external to and/or removable from access network entity 80 and may interface with access network entity 80 in various manners. As shown, data storage 86 may contain (i) program data 92 and (ii) program logic 94, which may be maintained either separately or together within data storage 86.

Program data 92 may contain information relating to wireless links over which access network entity 80 may communicate with access terminals. For example, program data 92 may contain an identifier of each such wireless link (e.g., a carrier frequency and a PN offset). As another example, program data 92 may contain identifiers of forward and/or reverse channels on each such wireless link (e.g., MAC IDs and/or Walsh codes). As still another example, program data 92 may contain data defining each coverage area served by each such wireless link (e.g., indications of the shape, size, and/or location of each coverage area). Other examples are possible as well.

Further, program data 92 may contain information relating to one or more access terminals being served by access network entity 80. For example, program data 92 may contain an identifier of each such access terminal. As another example, program data 92 may contain an identifier of a wireless link serving each such access terminal. As yet another example, program data 92 may contain identifiers of any forward and/or reverse channels established with each such access terminal (e.g., MAC IDs and/or Walsh codes). Other examples are possible as well.

Further yet, program data 92 may contain information relating to each active communication session between access network entity 80 and an active access terminal. For example, program data 92 may contain data defining each such active communication session, including identifiers of the access terminal, the access network entities, the wireless link(s), and/or the forward and reverse channel(s) involved in the active communication session. As another example, for each such active communication session, program data 92 may contain a determined channel quality at which each involved wireless link is carrying the active communication session. Other examples are possible as well.

Program logic 94 preferably comprises machine-language instructions that may be executed or interpreted by processor 84 to carry out functions in accordance with example power-control process 40. For example, program logic 94 may be executable by processor 84 to (a) engage in a given communication session with access terminal 14 on multiple wireless links provided by at least one BTS coupled to access network entity 80, (b) determine a respective channel quality at which each of the multiple wireless links is carrying the given communication session, and (c) based on the respective channel quality at which each of the multiple wireless links is carrying the given communication session, causing an adjustment of the respective forward PCC power level at which to send PCCs directed to access terminal 14 on at least one of the multiple wireless links. Program logic 94 may be executable by processor 84 to carry out various other functions as well.

V. Conclusion

Example embodiments have been described above. Those skilled in the art will understand, however, that changes and modifications may be made to the embodiments described without departing from the true scope and spirit of the present invention, which is defined by the claims.

I claim:

1. A method comprising:
    a first entity engaging in a given communication session with a second entity on multiple wireless links during which bearer data is sent to the second entity on each respective wireless link of the multiple wireless links at a respective traffic power level and power control command (PCC) data is sent to the second entity on each respective wireless link of the multiple wireless links at a respective PCC power level that is defined as a summation of (i) the respective traffic power level for the wireless link and (ii) a respective PCC offset value for the wireless link;
    the first entity identifying a first wireless link of the multiple wireless links as carrying the given communication session at a best channel quality; and
    in response to identifying the first wireless link, the first entity causing an increase of the respective PCC offset value for the first wireless link to an increased PCC offset value so that PCC data is sent to the second entity on the first wireless link at an increased PCC power level that is defined as a summation of (i) the respective traffic power level for the first wireless link and (ii) the increased PCC offset value.

2. The method of claim 1, wherein the first entity comprises an access network entity and the second entity comprises an access terminal.

3. The method of claim 1, wherein identifying the first wireless link as carrying the given communication session at a best channel quality comprises:
    determining a channel quality at which each respective wireless link of the multiple wireless links is carrying the given communication session; and
    comparing the determined channel qualities and thereby determining that the first wireless link is carrying the given communication session at the best determined channel quality.

4. The method of claim 1, wherein identifying the first wireless link as carrying the given communication session at a best channel quality comprises identifying the first wireless link as carrying bearer data for the given communication session at a lowest error rate.

5. The method of claim 1, wherein identifying the first wireless link as carrying the given communication session at a best channel quality comprises identifying the first wireless link as carrying the given communication session at a highest signal-to-noise ratio.

6. The method of claim 1, further comprising:
    the first entity beginning to send PCCs directed to the second entity on the first wireless link at the increased PCC power level.

7. The method of claim 1, wherein causing an increase of the respective PCC offset value for the first wireless link comprises instructing a third entity to increase the respective PCC offset value for the first wireless link.

8. The method of claim 1, further comprising:
    subsequently to identifying the first wireless link as carrying the given communication session at a best channel quality, the first entity identifying a second wireless link of the multiple wireless links as carrying the given communication session at the best channel quality; and
    in response to identifying the second wireless link, the first entity (a) causing an increase of the respective PCC offset value for the second wireless link and (b) causing a decrease of the respective PCC offset value for the first wireless link.

9. The method of claim 1, wherein the respective PCC power level and the respective traffic power level for the first wireless link each vary depending on PCCs received from the second entity on the first wireless link.

10. A method comprising:
    a first entity engaging in a given communication session with a second entity on multiple wireless links during which bearer data is sent to the second entity on each respective wireless link of the multiple wireless links at a respective traffic power level and power control command (PCC) data is sent to the second entity on each respective wireless link of the multiple wireless links at a respective PCC power level that is defined as a summation of (i) the respective traffic power level for the wireless link and (ii) a respective PCC offset value for the wireless link;
    the first entity determining that a respective channel quality of each respective wireless link of the multiple wireless links satisfies a given condition; and
    in response to the determining, causing an adjustment of the respective PCC offset value for each respective wireless link of the multiple wireless links in a coordinated manner so that PCC data is sent to the second entity on each respective wireless link at a respective adjusted power level.

11. The method of claim 10, wherein the first entity comprises an access network entity and the second entity comprises an access terminal.

12. The method of claim 10, wherein determining that the respective channel quality of each respective wireless link of the multiple wireless links satisfies the given condition comprises:
    comparing the respective channel quality of each respective wireless link of the multiple wireless links to an upper limit and thereby determining that the respective channel quality of each respective wireless link of the multiple wireless links is greater than the upper limit.

13. The method of claim 12, wherein causing an adjustment of the respective PCC offset value for each respective wireless link of the multiple wireless links in a coordinated manner comprises:
    causing a decrease of the respective PCC offset value for each respective wireless link of the multiple wireless links.

14. The method of claim 10, wherein determining that the respective channel quality of each respective wireless link of the multiple wireless links satisfies the given condition comprises:
    comparing the respective channel quality of each respective wireless link of the multiple wireless links to a lower limit and thereby determining that the respective channel quality of each respective wireless link of the multiple wireless links is less than the lower limit.

15. The method of claim 14, wherein causing an adjustment of the respective PCC offset value for each respective wireless link of the multiple wireless links in a coordinated manner comprises:
   causing an increase of the respective PCC offset value for each respective wireless link of the multiple wireless links.

16. The method of claim 10, further comprising:
   the first entity beginning to send PCCs directed to the second entity on each respective wireless link of the multiple wireless links at the respective adjusted PCC power level for the respective wireless link.

17. The method of claim 10, wherein causing an adjustment of the respective PCC offset value for each respective wireless link of the multiple wireless links comprises:
   instructing one or more other entities to adjust the respective PCC offset value for each respective wireless link of the multiple wireless links.

18. An access network entity comprising:
   a communication interface configured to facilitate communication with an access terminal via a path that includes one or more wireless links provided by one or more base transceiver stations (BTSs);
   a processor;
   data storage; and
   program instructions stored in data storage and executable by the processor to:
      engage in a given communication session with an access terminal on multiple wireless links during which bearer data is sent to the access terminal on each respective wireless link of the multiple wireless links at a respective traffic power level and power control command (PCC) data is sent to the access terminal on each respective wireless link of the multiple wireless links at a respective PCC power level that is defined as a summation of (i) the respective traffic power level for the wireless link and (ii) a respective PCC offset value for the wireless link;
      identify a first wireless link of the multiple wireless links as carrying the given communication session at a best channel quality; and
      in response to the identification of the first wireless link, cause an increase of the respective PCC offset value for the first wireless link to an increased PCC offset value so that PCC data is sent to the access terminal on the first wireless link at an increased PCC power level that is defined as a summation of (i) the respective traffic power level for the first wireless link and (ii) the increased PCC offset value.

19. An access network entity comprising:
   a communication interface configured to facilitate communication with an access terminal via a path that includes one or more wireless links provided by one or more base transceiver stations (BTSs);
   a processor;
   data storage; and
   program instructions stored in data storage and executable by the processor to:
      engage in a given communication session with an access terminal on multiple wireless links during which bearer data is sent to the access terminal on each respective wireless link of the multiple wireless links at a respective traffic power level and power control command (PCC) data is sent to the access terminal on each respective wireless link of the multiple wireless links at a respective PCC power level that is defined as a summation of (i) the respective traffic power level for the wireless link and (ii) a respective PCC offset value for the wireless link;
      determine that a respective channel quality of each respective wireless link of the multiple wireless links satisfies a given condition; and
      in response to the determining, cause an adjustment of the respective PCC offset value for each respective wireless link of the multiple wireless links in a coordinated manner so that PCC data is sent to the access terminal on each respective wireless link at a respective adjusted power level.

* * * * *